(12) United States Patent
Battista et al.

(10) Patent No.: US 7,782,811 B2
(45) Date of Patent: Aug. 24, 2010

(54) MULTIPLE RETURN LINK

(75) Inventors: Rich Battista, Ashburn, VA (US); Jay Brosius, Frederick, MD (US); Uday Shankar, Herndon, VA (US)

(73) Assignee: SkyBitz, Inc., Sterling, VA (US)

( * ) Notice: Subject to any disclaimer, the term of this patent is extended or adjusted under 35 U.S.C. 154(b) by 498 days.

(21) Appl. No.: 11/397,936

(22) Filed: Apr. 5, 2006

(65) Prior Publication Data
US 2006/0291409 A1 Dec. 28, 2006

Related U.S. Application Data

(60) Provisional application No. 60/668,108, filed on Apr. 5, 2005.

(51) Int. Cl.
*H04B 7/216* (2006.01)

(52) U.S. Cl. .................. 370/320; 370/335; 370/347; 370/503; 370/321; 455/12.1; 455/427; 455/434

(58) Field of Classification Search ............... 455/12.1, 455/456.1, 427, 13.3; 370/321, 320, 319, 370/322, 335, 519, 347
See application file for complete search history.

(56) References Cited

U.S. PATENT DOCUMENTS

| | | | |
|---|---|---|---|
| 5,668,556 A * | 9/1997 | Rouffet et al. ............... 342/354 |
| 5,955,986 A | 9/1999 | Sullivan | |
| 5,974,315 A | 10/1999 | Hudson | |
| 5,991,279 A | 11/1999 | Haugli et al. | |
| 6,094,162 A | 7/2000 | Sullivan | |
| 6,154,171 A | 11/2000 | Sullivan | |
| 6,169,514 B1 | 1/2001 | Sullivan | |
| 6,243,648 B1 | 6/2001 | Kilfeather et al. | |
| 6,480,788 B2 | 11/2002 | Kilfeather et al. | |
| 6,560,536 B1 | 5/2003 | Sullivan et al. | |
| 6,570,858 B1 * | 5/2003 | Emmons et al. ............. 370/321 |
| 6,587,443 B1 * | 7/2003 | Dutta ......................... 370/322 |
| 6,684,057 B2 * | 1/2004 | Karabinis ................. 455/12.1 |
| 6,725,158 B1 | 4/2004 | Sullivan et al. | |
| 6,788,917 B1 * | 9/2004 | Refai et al. ................ 455/12.1 |
| 7,142,521 B2 | 11/2006 | Haugli et al. | |
| 2002/0061730 A1 * | 5/2002 | Hart et al. ................. 455/12.1 |
| 2002/0105976 A1 * | 8/2002 | Kelly et al. ................. 370/519 |
| 2003/0043761 A1 * | 3/2003 | Hladik ....................... 370/319 |
| 2004/0037238 A1 * | 2/2004 | Schiff et al. ................ 370/321 |
| 2004/0114556 A1 * | 6/2004 | Miller et al. ................ 370/335 |
| 2004/0142660 A1 * | 7/2004 | Churan ..................... 455/12.1 |
| 2005/0227618 A1 * | 10/2005 | Karabinis et al. .......... 455/13.3 |
| 2007/0040744 A1 * | 2/2007 | Zimmerman et al. ........ 342/464 |
| 2007/0232298 A1 * | 10/2007 | Karabinis ................... 455/427 |

OTHER PUBLICATIONS

Written Opinion.
International Search Report and Written Opinion of International Searching Authority.

* cited by examiner

*Primary Examiner*—Charles N Appiah
*Assistant Examiner*—Michael T Vu
(74) *Attorney, Agent, or Firm*—Duane S. Kobayashi

(57) ABSTRACT

A system and method for improving efficiency of satellite communications is described. In one embodiment, multiple return links are associated with a single forward link to reduce communications costs.

12 Claims, 2 Drawing Sheets

MULTIPLE RETURN LINK

This application claims priority to Provisional Application No. 60/668,108, filed Apr, 5, 2005, which is incorporated herein by reference in its entirety.

BACKGROUND

1. Field of the Invention

The present invention relates generally to satellite communication systems and methods and, more particularly, to a system and method for efficient use of satellite communications capacity.

2. Introduction

Tracking mobile assets represents a growing enterprise as companies seek increased visibility into the status of a service fleet (e.g., long-haul delivery fleet). Visibility into the status of a service fleet can be gained through mobile terminals that are affixed to service vehicles. These mobile terminals can be designed to generate position information that can be used to update status reports that are provided to customer representatives.

In generating status reports to a centralized facility, the mobile terminal can generate position information through the reception of satellite position signals such as that generated by the GPS satellite network. Generated status reports are transmitted to the centralized facility using a return link via a communications satellite. Usage of the communications satellite comes at a significant cost. What is needed therefore is to ensure that usage of the communications satellite is efficient, thereby minimizing the overall communications cost.

SUMMARY

The present invention meets the above-mentioned needs by providing a system and method for improving efficiency of satellite communications. In one embodiment, multiple return links are associated with a single forward link to reduce communications costs.

Additional features and advantages of the invention will be set forth in the description which follows, and in part will become more fully apparent from the following description and appended claims, or may be learned by practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Reduction of satellite communications cost can be achieved by increasing the efficiency of use of communications satellite channel capacity. In accordance with the present invention, an increase in the efficiency of use of communications satellite channel capacity can be obtained by leveraging an imbalance in satellite communications costs between the forward and return satellite communications links.

The principles of the present invention are based on the recognition that satellite communication links in one direction may be more expensive than satellite communications links in the reverse direction. For example, in the communication between a ground station and a remote terminal, satellite return link capacity (mobile terminal to ground station) is often less expensive as compared to the forward link capacity (ground station to mobile terminal).

Typically, a satellite forward link is more expensive than the satellite return link because most of the cost and resources of the satellite are associated with the power required for transmission to devices on the ground (e.g., mobile terminal) having small, low-gain antennae. In contrast, much less power is required by the satellite to transmit to the ground station on the return satellite link since it is transmitting to a very large, high-gain dish (e.g., 13 meter diameter).

In this environment, the forward satellite link is used to carry message communications from an operations center to a plurality of mobile terminals, while the return satellite link is used to carry message communications from the plurality of mobile terminals to the operations center. In one application, the forward satellite link is used to carry a status request message to the mobile terminals, and the return satellite link is used to carry a status reply message (e.g., including position information, sensor information, etc.) from the mobile terminals to the operations center.

While bidirectional communication between the operations center and the plurality of mobile terminals is supported, the valuable pieces of information in this application are the status reply information sent on the return link. Thus, it is a feature of the present invention that overall satellite costs can be reduced by increasing the amount of status reply traffic on the less expensive return links as compared to the amount of status request message traffic on the more expensive forward links. This unequal weighting in return link traffic as compared to forward link traffic takes advantage of the relative imbalance of communication costs between the different directions of communications.

Figure 1:
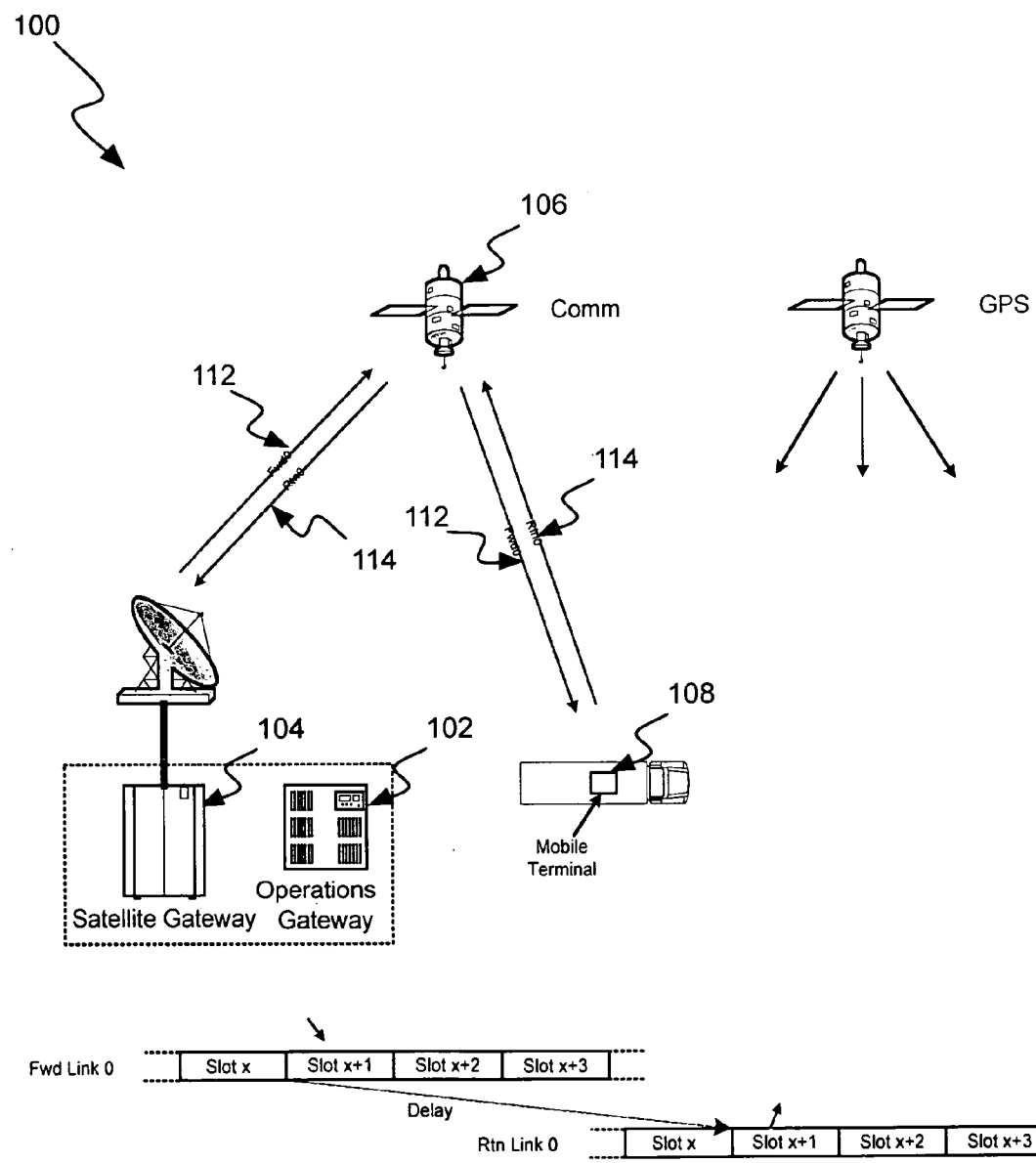
FIG. 1 illustrates an embodiment of a satellite communications network that enables the monitoring of remote assets.

Prior to describing the details of an application of the principles of the present invention, a description of an embodiment of an operational context is first provided. FIG. 1 illustrates an embodiment of a satellite network 100 that includes operations gateway 102, communicating with mobile terminal 108 on an asset. Communication between operations gateway 102 and the mobile terminal is facilitated by satellite gateway 104 at the ground station and a satellite modem processor (not shown) in the mobile terminal. Both satellite gateway 104 and the satellite modem processor facilitate communication using one forward and one return link (frequency) over the communications satellite.

In one embodiment, the satellite communication is implemented in a time division multiple access (TDMA) structure, which consists of 57600 time slots each day, per frequency or link, where each slot is 1.5 seconds long. On forward link 112, operations gateway 102 sends a message or packet to mobile terminal 108 on one of the 1.5 second slots. Upon receipt of this message or packet, mobile terminal 108 would then perform a GPS collection (e.g., code phase measurements) or to perform sensor measurements and transmit the data back to operations gateway 102 on return link 114, on the same slot, delayed by a fixed time defined by the network. In one embodiment, the fixed delay defines a length of time that enables mobile terminal 108 to decode the forward packet, perform the data collection and processing, and build and transmit the return packet.

In one embodiment, mobile terminal 108 can be configured to produce periodic status reports. In this configuration, mobile terminal 108 would wake up periodically, search for its assigned forward slot, perform data collection and processing, and transmit the status report on the assigned return slot. In another embodiment, mobile terminal 108 can be configured to produce a status report upon an occurrence of an event (e.g., door opening, motion detected, sensor reading, etc.). In this configuration, mobile terminal 108 would wake up upon occurrence of an event, search for an available forward slot, perform data collection and processing, and transmit the status report on the return slot corresponding to the identified available forward slot.

Upon receipt of a status report from mobile terminal 108, operations gateway 102 passes the information to an operations center (not shown), where the information is processed and passed to a customer via the Internet. A detailed description of this communications process is provided in U.S. Pat. No. 6,725,158, entitled "System and Method for Fast Acquisition Position Reporting Using Communication Satellite Range Measurement," which is incorporated herein by reference in its entirety. As would be appreciated, the principles of the present invention can also be applied to other satellite communications systems as well as to terrestrial communications systems.

In the example of FIG. 1, the cost of the service per mobile terminal report is based on the number of reports per day per frequency divided by the cost of the forward and return frequency pair per day. This estimate assumes that all possible slots per day are used. In reality, however, this is not always the case. Like many wireless products (e.g., cell phones), the frequencies are used when users are awake. Activity therefore becomes concentrated during a period referred to as the "prime-time" period. With this imbalanced activity model, the cost per report can increase by eight fold if only prime-time slots are used and the remaining ⅞ of the total number of slots are relatively unused. This type of communications inefficiency is addressed through the principles of the present invention as detailed below.

In accordance with the present invention, slot efficiency is increased by maximizing slot utility. Many examples of this efficiency framework exist. For example, use of high-cost slots can be restricted to high-utility messages. In another example, low-cost slots can be utilized more freely to accommodate both high-utility and low-utility messages. As would be appreciated, many slot assignment models can be defined depending on the application. In general, a relative comparison of the value of the slots and the utility of the messages should be considered to ensure that the matching of messages to available slots yields the maximum benefit for a given communications cost. As would further be appreciated, this form of analysis can be fixed or adaptive depending on the characteristics of change in costs and utility.

In one embodiment, the analysis of costs and utility can dictate that forward link and return link messaging pairs should not be tightly coupled. In other words, while traditional query and response messaging would dictate the customary usage of discrete messaging pairs, such messaging pairs may not efficiently use slots that have uneven associated costs. This environment is exemplified in the above noted example where satellite return link capacity is often less expensive as compared to the satellite forward link capacity. In this uneven cost environment example, slot efficiency can be increased through the restriction on use of forward link capacity and the relative increase in use of the return link capacity. Both of these possibilities suggest that a change in the traditional messaging pair framework would benefit communications efficiency.

Figure 2:
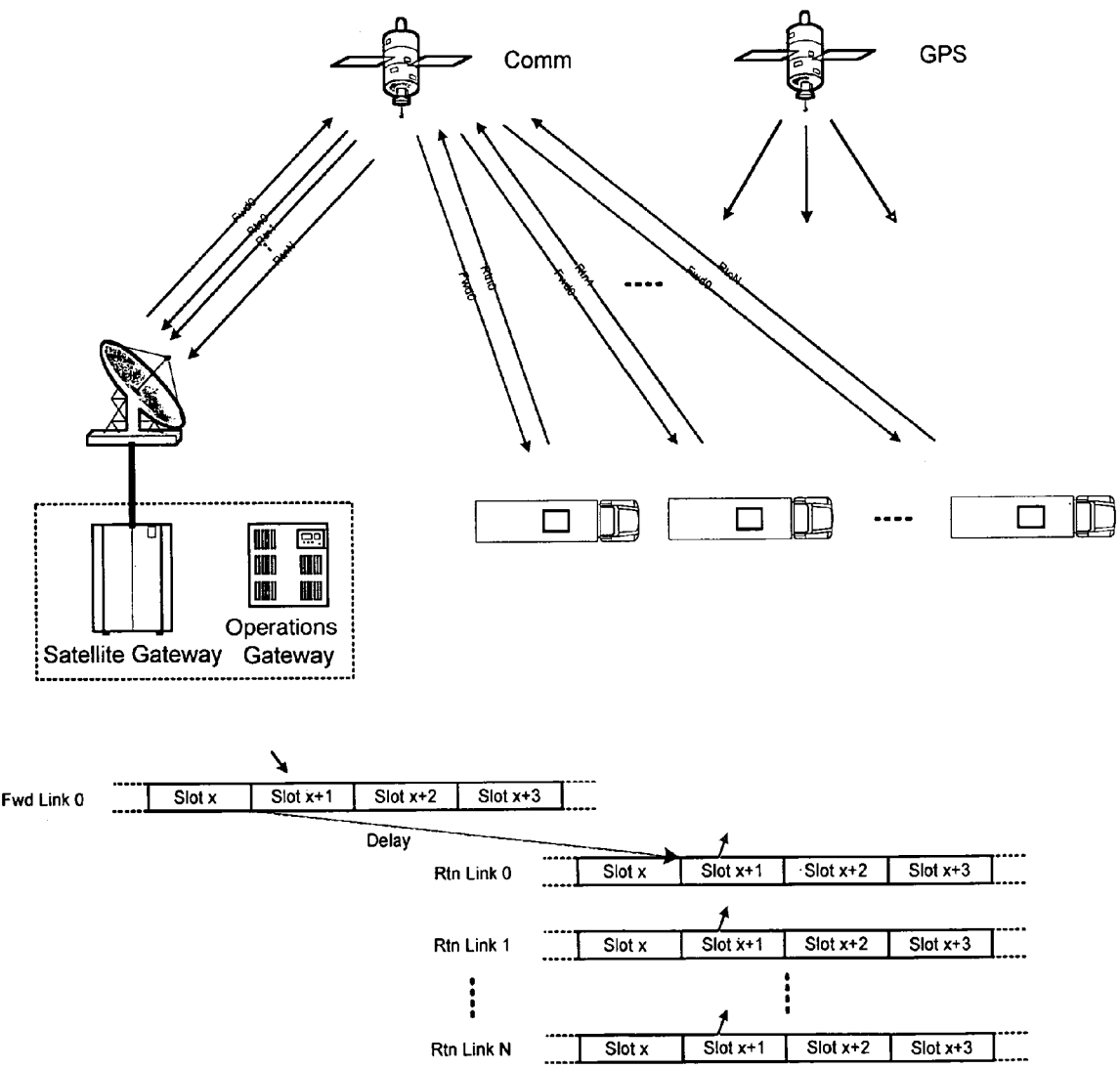
FIG. 2 illustrates an embodiment of increasing efficiency in the use of satellite communications capacity.

FIG. 2 illustrates an embodiment that increases communications efficiency within an uneven cost framework. In this embodiment, multiple satellite return links are associated with each satellite forward link. Here, one forward link (Fwd0) is sent to N mobile terminals or assets at one time. This is in contrast to the traditional messaging pair framework of FIG. 1, where a forward link is sent to only one mobile terminal, thereby producing a discrete messaging pair.

The number N in this embodiment represents the number of mobile terminals that can be addressed in one packet sent on the forward link (Fwd0). As would be appreciated, the number N would be dependent on the particular messaging protocol being implemented.

In the one-to-many embodiment message coupling illustrated in FIG. 2, each of the mobile terminals share the same forward link frequency, but have separate return link frequencies (Rtn0, Rtn1 . . . RtnN). Each mobile terminal receives the same forward packet and command on the forward slot (slot x+1) and responds on its corresponding return link frequency at the same time on the return slot (slot x+1). The forward and return slots are offset by the delay period noted above. The result of this messaging model is the receipt of N reports at the operations center through the use of one forward slot and N return slots. This is in contrast to the previous messaging model where N forward slots and N return slots were used to generate the same N mobile terminal reports. The result is the elimination of use of N-1 higher cost forward slots while still enabling achievement of the same results. By reducing the number of more expensive forward slots, the overall cost per report goes down.

It should be noted that the principles of the present invention can change the way that frequencies are allocated for the forward and return links. In particular, overhead and efficiency issues may need to be addressed, for example, when re-acquiring frequencies during a beam switch.

A satellite beam covers a limited geographical region in which the satellite can broadcast a large bandwidth of frequency. When a mobile terminal transitions between beams it must re-acquire a new set of forward and return link frequencies for that beam. This re-acquisition process is enabled through broadcast channels that contain information about adjacent channel frequencies. A problem can occur since multiple mobile terminals may acquire the same set of frequencies when they switch to the adjacent beam. Since a limited number of mobile terminals can operate on one set of frequencies, they are immediately moved to another set of frequencies referred to as their "home frequencies". This scenario would not be scalable since a bottleneck can occur when a large number of mobile terminals try to pass through this one set of frequencies. In addition, there is overhead associated with beam switching which causes more battery usage, and more channel capacity.

In one embodiment, this bottleneck is avoided by having the mobile terminals ignore the adjacent channel frequencies under most conditions, and simply maintain the last set of frequencies for each beam. This avoids routing through the same frequencies during a beam switch and the extra wakeups and transmits required to return the MT to its home frequencies in that beam. Only during certain conditions (e.g., during initial registration, or if the MT is lost, or has been covered for a long period of time), may it re-acquire the adjacent frequencies, route through the default frequencies, and get moved back to its home frequency.

As described, the principles of the present invention enable a mechanism for using less-expensive return link frequencies to obtain the same number of position reports. The number of return links that can be used is limited by the number of mobile terminals that can be uniquely addressed in the forward link.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A satellite communications method, comprising:
   a. transmitting a message on a first of a plurality of forward slots on a forward satellite link, said transmitted message communicating an inquiry to a first and a second mobile terminal;
   b. receiving a first response from said first mobile terminal, said first response being carried on a first return slot on a first return satellite link, said first return slot being offset from said first forward slot on said forward satellite link by a delay period, said first response including first information generated by said first mobile terminal in response to said inquiry; and
   c. receiving a second response from said second mobile terminal, said second response being carried on a second return slot on a second return satellite link different from said first return satellite link, said second return slot being offset from said first forward slot on said forward satellite link by said delay period, said second response including second information generated by said second mobile terminal in response to said inquiry.

2. The method of claim 1, wherein said slots are time division multiple access slots.

3. The method of claim 1, wherein said first and second response includes positioning information.

4. The method of claim 3, wherein said first and second response includes code phase information.

5. The method of claim 1, wherein said first and second response includes sensor information.

6. The method of claim 1, wherein each forward link and return link is on a different frequency.

7. A satellite communications system, comprising:
   a transmitter that transmits a message on a first of a plurality of slots on a forward satellite link, said transmitted message communicating an inquiry to a first and a second mobile terminal; and
   a receiver that receives a first response from said first mobile terminal and a second response from said second mobile terminal, said first response being carried on a first return slot on a first return satellite link and said second response being carried on a second return slot on a second return satellite link different from said first return satellite link, said first return slot and said second return slot both being offset from said first forward slot on said forward satellite link by a same delay period, said first response including first information generated by said first mobile terminal in response to said inquiry, said second response including second information generated by said second mobile terminal in response to said inquiry.

8. The system of claim 7, wherein said slots are time division multiple access slots.

9. The system of claim 7, wherein said first and second response includes positioning information.

10. The system of claim 7, wherein said first and second response includes code phase information.

11. The system of claim 7, wherein said first and second response includes sensor information.

12. The system of claim 7, wherein each forward link and return link is on a different frequency.

* * * * *